United States Patent
Bossen

(10) Patent No.: US 6,785,422 B2
(45) Date of Patent: Aug. 31, 2004

(54) IMAGE PROCESSING APPARATUS UTILIZING PIXEL VALUES OF PERIPHERAL PIXELS ADJACENT THE SUBJECT PIXEL

(75) Inventor: Frank Jan Bossen, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/168,785
(22) PCT Filed: Oct. 18, 2001
(86) PCT No.: PCT/JP01/09137
§ 371 (c)(1), (2), (4) Date: Oct. 15, 2002
(87) PCT Pub. No.: WO02/35825
PCT Pub. Date: May 2, 2002

(65) Prior Publication Data
US 2003/0058481 A1 Mar. 27, 2003

(30) Foreign Application Priority Data
Oct. 20, 2000 (JP) ........................................ 2000-320211

(51) Int. Cl.[7] .......................... H04N 1/41; H04N 1/419; H04N 7/32; G06T 9/00
(52) U.S. Cl. ........................ 382/232; 382/233; 382/238; 382/239; 382/244; 341/50
(58) Field of Search .................. 358/1.1–1.9, 1.11–1.18, 358/3.64, 3.22, 426.01, 426.02, 426.04, 426.07, 426.12, 426.13, 426.14, 426.15, 426.16; 382/232–253; 341/50–107

(56) References Cited

U.S. PATENT DOCUMENTS

| 4,363,036 A | * 12/1982 | Subramaniam ............. 382/238 |
| 4,870,695 A | * 9/1989 | Gonzales et al. ........... 382/238 |
| 5,680,129 A | * 10/1997 | Weinberger et al. .......... 341/65 |
| 5,923,783 A | 7/1999 | Kawauchi et al. .......... 382/233 |

FOREIGN PATENT DOCUMENTS

| JP | 63-197172 | 8/1988 |
| JP | 3-35678 | 2/1991 |
| JP | 10-51791 | 2/1998 |
| WO | WO 97/35422 | 9/1997 |

* cited by examiner

Primary Examiner—King Y. Poon
(74) Attorney, Agent, or Firm—Frommer Lawrence & Haug LLP; William S. Frommer

(57) ABSTRACT

The present invention relates to an image processing apparatus, and to realize improved lossless compression of images more efficiently. A first predictor 11 generates a prediction signal P out of peripheral pixel values supplied from a pixel sequence generator 2. A second predictor 12 generates a prediction signal Q out of the peripheral pixel values supplied from the pixel sequence generator 2. An adder 4 subtracts the prediction signal P from the current pixel value to thereby calculate a prediction error signal M. When the prediction signal Q is greater than the prediction signal P, an inverter 14 inverts the polarity of the prediction error signal M to consequently generate a prediction error signal N. And an entropy encoder 5 allocates a code word in accordance with the prediction error signal N generated by the inverter 14.

11 Claims, 7 Drawing Sheets

FIG. 4

| PREDICTION ERROR SIGNL | CORRESPONDING VALUE |
|---|---|
| 0 | 0 |
| −1 | 1 |
| 1 | 2 |
| −2 | 3 |
| 2 | 4 |
| −3 | 5 |
| 3 | 6 |
| −4 | 7 |
| 4 | 8 |
| −5 | 9 |
| 5 | 10 |
| −6 | 11 |
| 6 | 12 |
| −7 | 13 |
| 7 | 14 |
| −8 | 15 |

FIG. 5

| CORRESPONDING VALUE | CODE WORD | OUTPUT CODE WORD | PREDICTION ERROR SIGNAL |
|---|---|---|---|
| 0 | 1 | 10 | 0 |
| 1 | 01 | 11 | -1 |
| 2 | 001 | 010 | 1 |
| 3 | 0001 | 011 | -2 |
| 4 | 00001 | 0010 | 2 |
| 5 | 000001 | 0011 | -3 |
| 6 | 0000001 | 00010 | 3 |
| 7 | 00000001 | 00011 | -4 |

F I G. 7 A
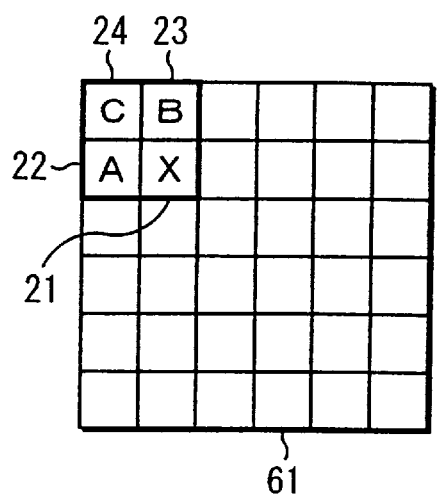
F I G. 7 B
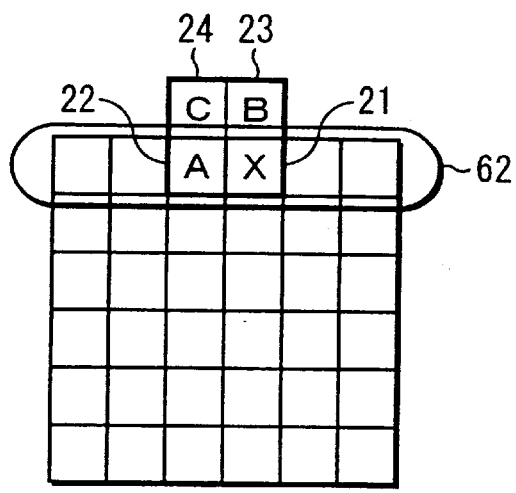
F I G. 7 C
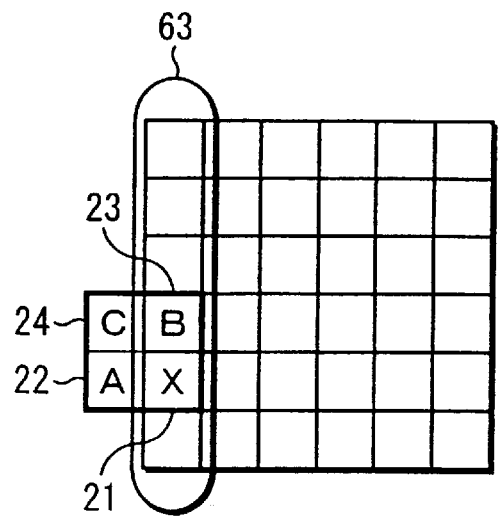

IMAGE PROCESSING APPARATUS UTILIZING PIXEL VALUES OF PERIPHERAL PIXELS ADJACENT THE SUBJECT PIXEL

TECHNICAL FIELD

The present invention relates to an image processing apparatus, and more particularly to an apparatus capable of compressing, for example, images efficiently without any loss.

BACKGROUND ART

It is usual recently that, in apparatus for handling image data, compression of image data is executed so as to reduce the amount of data to be stored or transmitted. For example, there is employed technology of lossless compression (in saving information).

In the known lossless compression technology, there are methods of CALIC, JPEG-LS and so forth.

Regarding the compression method known as CALIC (A Context-based, Adaptive, Lossless Image Codec), the details thereof are disclosed in, e.g., X. Wu and N. Memon, "Context-Based, Adaptive, Lossless Image Coding, IEEE Transactions on Communications", Vol. 45, No. 4, April 1997, pp. 437–444.

Meanwhile, regarding the other compression method known as JPEG-LS (Joint Photographic Experts Group Lossless), the details thereof are disclosed in, e.g., "Lossless and Near-Lossless Coding of Continuous Tone Still Images", ISO/IEC JTC1/SC29 WG1 14495.

In the compression methods of CALIC and JPEG-LS, there is adopted DPCM (Differential Pulse Code Modulation), wherein pixels of each image are scanned per row (line) and per column. The DPCM is a technique of predicting a subject pixel from peripheral pixels and encoding a prediction error signal thereof. It is capable of encoding the signal without impairing the information amount of the original image.

When such lossless compression is executed, a prediction signal is calculated, with regard to individual pixels, on the basis of peripheral pixel values around each pixel (subject pixel). An entropy encoder encodes the prediction error signal of the calculated pixel value, i.e., the difference between the prediction signal and the effective pixel value (actual signal).

FIG. 1 is a block diagram for explaining a conventional lossless image compressing apparatus.

In an image buffer 1, there is stored an image inputted from an unshown external device. A pixel sequence generator 2 scans the image stored in the image buffer 1, then extracts, with regard to each pixel, peripheral pixels from the current subject pixel, and supplies the value of the current subject pixel to an adder 4 while supplying the values of the generated peripheral pixels to a predictor 3.

The predictor 3 generates a prediction signal on the basis of the peripheral pixel values obtained from the pixel sequence generator 2, and then supplies the prediction signal to the adder 4. Subsequently the adder 4 subtracts the prediction signal, which has been supplied thereto from the predictor 3, from the current pixel value obtained from the pixel sequence generator 2, and supplies a prediction error signal to an entropy encoder 5.

Details of a simplified effective predictor 3 are disclosed in, e.g., S. Martucci, "Reversible Compression of HDTV Images using Median Adaptive Prediction and Arithmetic Coding", IEEE 1990.

The entropy encoder 5 generates a compressed code word from the sequence of the prediction error signal supplied from the adder 4, and then outputs such a code word.

The prediction error signal is encoded as a variable-length prefix and a fixed-length suffix. The variable-length prefix is composed of a series of "0" bits that succeed a "1" bit. The sequence of the prediction error signal is divided by block. In each block, the optimal length of the suffix is decided first, and a code word is transmitted prior to being combined with the individual prediction error signal of the block.

Details of the entropy encoder 5 are disclosed in, e.g., R. Rice, "Lossless Coding Standards for Space Data Systems", IEEE 1997.

However, since the known lossless compression methods described above is dependent on the past prediction progress, there exists a problem that a memory is required for storing the past prediction progress.

DISCLOSURE OF INVENTION

The present invention has been made in view of the circumstances. And it is an object of the invention to realize more efficient lossless compression of images by selectively inverting the polarity of a prediction error signal without maintaining the past prediction progress.

An image processing apparatus of the present invention includes first generator for measuring the pixel values of three peripheral pixels adjacent to a subject pixel currently, and generating a first prediction signal from the measuring result; second generator for generating a second prediction signal which represents the average value of the maximum and the minimum out of the measured values of the three peripheral pixels; calculator for calculating a prediction error signal on the basis of the first prediction signal generated by the first generator and the pixel-value of the subject pixel; comparator for comparing the first prediction signal generated by the first generator with the second prediction signal generated by the second generator; inverter for inverting, on the basis of the comparison result obtained from the comparator, the polarity of the prediction error signal calculated by the calculator; and invertercode word allocator for allocating a code word in accordance with the prediction error signal inverted in polarity by the inverter.

The first generator measures the values A, B and A+B−C from the respective values A, B and C of the three peripheral pixels, and generates the intermediate value thereof as a first prediction signal.

When the first prediction signal generated by the first generator is greater than the second prediction signal generated by the second generator, the inverter may be capable of not inverting the polarity of the prediction error signal.

The peripheral pixels may consist of the pixel on the left side of the subject pixel, the pixel on the upper side of the subject pixel, and the pixel on the upper left side of the subject pixel.

The first generator may be a median adaptive predictor.

An image processing method of the present invention includes a first generation step of measuring the pixel values of three peripheral pixels adjacent to a subject pixel currently, and generating a first prediction signal from the measuring result; a second generation step of generating a second prediction signal which represents the average value of the maximum and the minimum out of the measured values of the three peripheral pixels; a calculation step of calculating a prediction error signal on the basis of the first prediction signal generated by the process at the first generation step and the pixel value of the subject pixel; comparison step of comparing the first prediction signal generated by the process at the first generation step with the second prediction signal generated by the process at the second generation step; an inversion control step of controlling, on the basis of the comparison result obtained by the process at the comparison step, inversion of the polarity of the prediction error signal calculated by the process at the calculation step; and a code word allocation step of allocating a code word in accordance with the prediction error signal controlled, with regard to inversion of its polarity, by the process at the inversion control step.

The first generator step measures the values A, B and A+B−C from the respective values A, B and C of the three peripheral pixels, and generates the intermediate value thereof as a first prediction signal.

When the first prediction signal generated by the process at the first generation step is greater than the second prediction signal generated by the process at the second generation step, the polarity of the prediction error signal is not inverted at the inversion control step.

When the first prediction signal generated by the process at the first generation step is smaller than the second prediction signal generated by the process at the second generation step, the polarity of the prediction error signal is inverted at the inversion control step.

The peripheral pixels are composed of the pixel on the left side of the subject pixel, the pixel on the upper side of the subject pixel, and the pixel on the upper left side of the subject pixel.

In the present invention, the intermediate value of three peripheral pixels adjacent to the subject pixel currently is measured to generate a first prediction signal from the measuring result, and the average value of the maximum and the minimum out of the measured values of the three peripheral pixels is generated as a second prediction signal. Then a prediction error signal is calculated on the basis of the first prediction signal and the pixel value of the subject pixel, and the polarity of the prediction error signal thus calculated is inverted on the basis of the result of comparing the first prediction signal with the second prediction signal. And subsequently a code word is allocated in accordance with the prediction error signal.

BRIEF DESCRIPTION OF DRAWINGS

FIG. 4 shows an example of a correspondence table.

FIG. 5 shows an example of a code word conversion table.

FIG. 7 is a diagram for explaining how to measure pixel values.

BEST MODE FOR CARRYING OUT THE INVENTION

Figure 2:
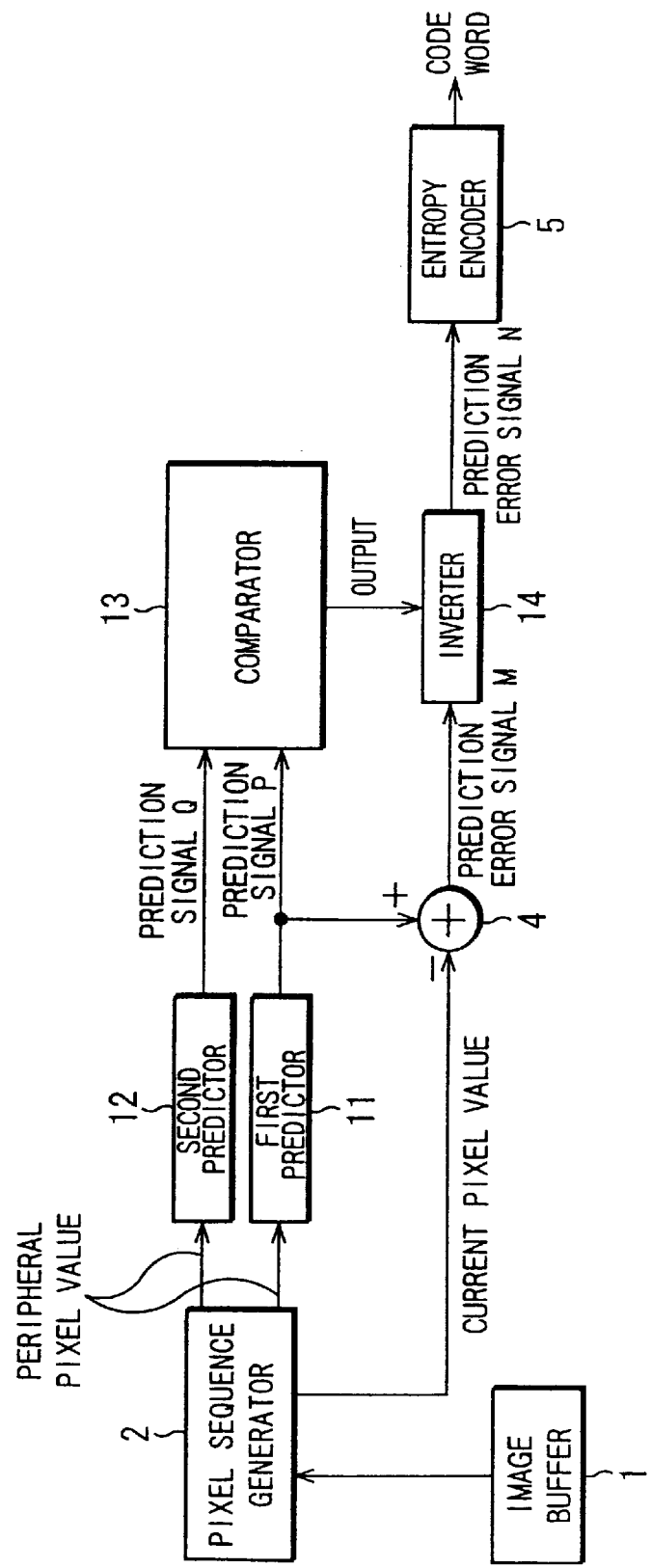
FIG. 2 is a block diagram showing a structural example of a lossless image compressing apparatus where the present invention is applied.

FIG. 2 is a block diagram showing a structural example of a lossless image compressing apparatus where the present invention is applied. In this diagram, any component parts corresponding to those in the conventional apparatus are denoted by the same reference numerals, and a repeated explanation thereof is omitted here.

Figure 3A:
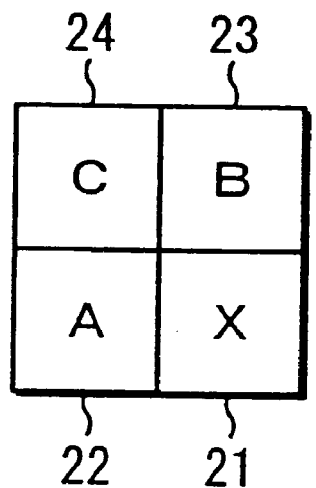
FIG. 3 is a diagram for explaining the positional relationship between peripheral pixels and a subject pixel.
Figure 3B:
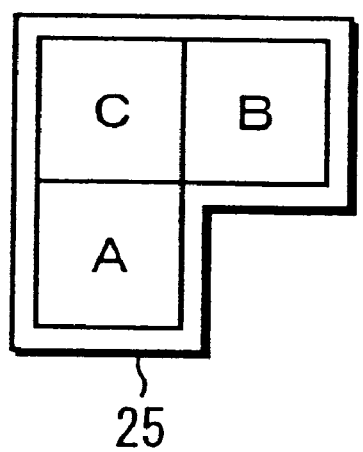

A pixel sequence generator 2 scans an image stored in an image buffer 1, then generates, with regard to each pixel, peripheral pixels (25 in FIG. 3(B)) from a subject pixel (21 in FIG. 3(A)) currently, and supplies the current pixel value to an adder 4 while supplying the generated peripheral pixel values to a first predictor 11 and a second predictor 12 respectively.

The first predictor 11 consists, for example, of a median adaptive predictor. It generates a prediction signal P on the basis of the peripheral pixel values of the peripheral pixels 25 (FIG. 3(B)) obtained from the pixel sequence generator 2, and then supplies the prediction signal P to a comparator 13 and the adder 4. And actuation of the first predictor 11 starts up the second predictor 12.

Referring now to FIG. 3, an explanation will be given on the positional relationship between the peripheral pixels 25 and the subject pixel 21 used in generating a prediction signal.

The subject pixel (X) 21 indicates a current pixel having a value X. The peripheral pixel (A) 22 on the left side of the subject pixel (X) 21 has a value A, and the peripheral pixel (B) 23 on the upper side of the subject pixel (X) 21 has a value B. And another peripheral pixel (C) 24 on the upper left side of the subject pixel (X) 21 has a value C. Hereinafter these peripheral pixels 22 to 24 will be referred to simply as peripheral pixels 25 (FIG. 3(B)).

Figure 1:
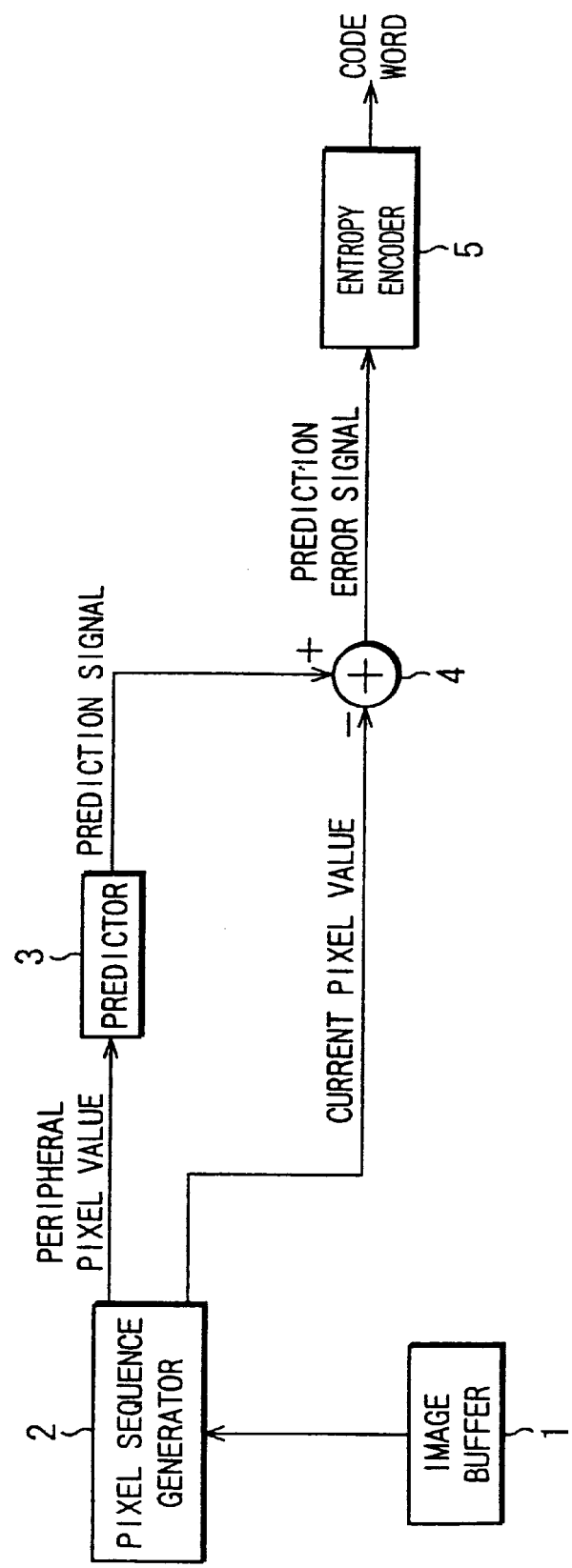
FIG. 1 is a block diagram showing a structural example of a conventional lossless image compressing apparatus.

The first predictor 11 executes prediction from the peripheral pixels 25. That is, the first predictor 11 measures a value A, a value B and a value (A+B−C) from the peripheral pixel (A) 22, the peripheral pixel (B) 23 and the peripheral pixel (C) 24 respectively, and then determines a prediction signal P which represents the intermediate value of the three measured values A, B and (A+B−C). It should be noted that the first predictor 11 has the same configuration as the predictor 3 explained in FIG. 1.

The second predictor 12 is started up in response to a start request received from the first predictor 11, and calculates a prediction signal Q according to Eq. (1), which is shown below, from the peripheral pixel (A) 22, the peripheral pixel (B) 23 and the peripheral pixel (C) 24 supplied from the pixel sequence generator 2.

$$\text{Prediction signal } Q=(\min(A, B, C)+\max(A, B, C))/2 \quad \ldots (1)$$

The second predictor 12 supplies to a comparator 13 the prediction signal Q calculated according to Eq. (1).

The comparator 13 compares the prediction signal P obtained from the first predictor 11 with the prediction signal Q obtained from the second predictor 12, and then delivers its output (result of such comparison) to an inverter 14. The output delivered here represents information that signifies whether the prediction signal P is greater or not than the prediction signal Q.

On the basis of the output thus delivered from the comparator 13, the inverter 14 inverts, when necessary, the polarity of a prediction error signal A (residual) outputted from the adder 4, and then delivers a prediction error signal N to an entropy encoder 5.

In the embodiment of the present invention, the inverter 14 inverts the polarity of the prediction error signal M when the output delivered from the comparator 13 indicates that the prediction signal P is smaller than the prediction signal Q. Further, the inverter 14 keeps the polarity of the prediction error signal M unchanged (without inversion) when the output delivered from the comparator 13 indicates that the prediction signal P is greater than the prediction signal Q.

Details of a method for selectively inverting the polarity of the prediction error signal to enhance the compression efficiency are disclosed in, e.g., X. Wu, "Lossless Compression of Continuous-Tone Images via Context Selection, Quantization, and Modeling", IEEE Transactions on Image Processing, Vol. 6, No. 5, May 1997, pp. 656–664.

In order to utilize the procedure of sign inversion, the entropy encoder 5 allocates, on the basis of the value of the prediction error signal N supplied from the inverter 14, either a code word shorter than a positive value equal in magnitude to the prediction error signal N or a code word equal in length to the prediction error signal N.

Details of such entropy encoder 5 are disclosed in, e.g., ISO/IEC JTC1/SC29 WG1 14495, "Lossless and Near Lossless Coding of Continuous Tone Still Images".

Next, an explanation will be given on the operation performed in the embodiment mentioned above.

The pixel sequence generator 2 scans the image stored in the image buffer 1, then generates peripheral pixels 22 to 24 from the subject pixel 21 (FIG. 3(A)) currently, and supplies the current pixel value X (e.g. "7") to the adder 4. The pixel values of the peripheral pixels 22 to 24 generated by the pixel sequence generator 2 are supplied to both the first predictor 11 and the second predictor 12. Now the operation will be described below under the condition that the peripheral pixel 22 has a pixel value A of "10", the peripheral pixel 23 has a pixel value B of "2", and the peripheral pixel 24 has a pixel value C of "7", respectively.

The first predictor 11 measures the values A, B and (A+B−C) from the peripheral pixels 22 to 24 supplied from the pixel sequence generator 2, and generates a prediction signal A which corresponds to the intermediate value thereof.

That is, since A=10, B=2 and (A+B−C)=(10 +2−7)=5, the intermediate value "5" is determined as a prediction signal P.

The second predictor 12 calculates, according to Eq. (1), a prediction signal Q out of the peripheral pixels 22 to 24 supplied from the pixel sequence generator 2.

That is, a value "6" is calculated as a prediction signal Q from (min (A, B, C)+max (A, B, C))/2=(min (10,2,7)+max (10,2,7))/2=(2+10)/2=6.

The prediction signal P calculated by the first predictor 11 and the prediction signal Q calculated by the second predictor 12 are supplied to the comparator 13. Meanwhile, the prediction signal P calculated by the first predictor 11 is supplied also to the adder 4.

The comparator 13 compares the prediction signal P supplied from the first predictor 11 with the prediction signal Q supplied from the second predictor 12, and then delivers its output (result of such comparison) to the inverter 14.

Subsequently the adder 4 subtracts the prediction signal P ("5" in this case), which has been obtained from the first predictor 11, from the current pixel value X ("7" in this case) obtained from the pixel sequence generator 2, and then supplies a prediction error signal M to the inverter 14. In this example, the value of the prediction error signal M becomes "2" as a result of 7−5=2.

On the basis of the output delivered from the comparator 13, the inverter 14 inverts, when necessary, the polarity of the prediction error signal M (residual) obtained from the adder 4, and then supplies a prediction error signal N to the entropy encoder 5.

For example, in case the prediction signal Q outputted from the second predictor 12 is greater than the prediction signal P outputted from the first predictor 11, the actual measured value of the pixel (pixel value) becomes further greater than the prediction signal Q outputted from the second predictor 12, so that the prediction error signal M is rendered positive in value. That is, in case the prediction signal P is greater than the prediction signal Q, the prediction error signal M is rendered reverse in polarity to the prediction error signal N.

Further, in case the prediction signal Q outputted from the second predictor 12 is smaller than the prediction signal P outputted from the first predictor 11, the actual measured value of the pixel becomes further smaller than the prediction signal Q outputted from the second predictor 12, so that the prediction error signal P is rendered negative in value. That is, when the prediction signal P is smaller than the prediction signal Q, the prediction error signal M is rendered the same in polarity as the prediction error signal N.

That is, in the case of this example, the value "6" of the prediction signal Q outputted from the second predictor 12 is greater than the value "5" of the prediction signal P outputted from the first predictor 11, so that the value "2" of the prediction error signal M is inverted in polarity to consequently obtain a value "−2".

Thus, when the value of the prediction signal Q is greater than the value of the prediction signal P, the prediction error signal M is inverted in polarity to thereby increase the possibility that the polarity of the prediction error signal N becomes negative, as a result, enhancing the compression efficiency.

The entropy encoder 5 determines, on the basis of the prediction error signal N supplied from the inverter 14, a corresponding value in accordance with a correspondence table shown in FIG. 4, then generates a code word from the corresponding value thus determined, according to a code word conversion table shown in FIG. 5, and outputs the generated code word.

In the example of FIG. 4, when the prediction error signal N is "0", its corresponding value is set to "0". When the prediction error signal N is "−1", its corresponding value is set to "1". When the prediction error signal N is "1", its corresponding value is set to "2". When the prediction error signal N is "−2", its corresponding value is set to "3". When the prediction error signal N is "2", its corresponding value is set to "4". When the prediction error signal N is "−3", its corresponding value is set to "5". When the prediction error signal N is "3", its corresponding value is set to "6". When the prediction error signal N is "−4", its corresponding value is set to "7". When the prediction error signal N is "4", its corresponding value is set to "8". When the prediction error signal N is "−5", its corresponding value is set to "9". When the prediction error signal N is "5", its corresponding value is set to "10". When the prediction error signal N is "−6", its corresponding value is set to "11". When the prediction error signal N is "6", its corresponding value is set to "12". When the prediction error signal N is "−7", its corresponding value is set to "13". When the prediction error signal N is "7", its corresponding value is set to "14". And when the prediction error signal N is "−8", its corresponding value is set to "15".

In the example of FIG. 5, when the corresponding value is "0", the code word is first converted into "1", and it is further converted into "10" as an output code word. When the corresponding value is "1", the code word is first converted into "01", and it is further converted into "11" as an output code word. When the corresponding value is "2", the code word is first converted into "001", and it is further converted into "010" as an output code word. When the corresponding value is "3", the code word is first converted into "0001", and it is further converted into "011" as an output code word. When the corresponding value is "4", the code word is first converted into "00001", and it is further converted into "0010" as an output code word. When the corresponding value is "5", the code word is first converted into "000001", and it is further converted into "0011" as an output code word. When the corresponding value is "6", the code word is first converted into "0000001", and it is further converted into "00010" as an output code word. And when the corresponding value is "7", the code word is first converted into "00000001", and it is further converted into "00011" as an output code word.

Therefore, in the case of this example where the prediction error signal N is "−2", the corresponding value thereof is set to "3" according to the correspondence table shown in FIG. 4. This value is converted into "0001" as a code word corresponding to the value "3", according to the code word conversion table shown in FIG. 5, and then further converted into "011" as an output code word.

In case the prediction error signal N is "2" for example, the corresponding value thereof is set to "4" according to the correspondence table shown in FIG. 4. This value is converted into "00001" as a code word corresponding to the value "4", according to the code word conversion table shown in FIG. 5, and then further converted into "0010" as an output code word.

Thus, when the prediction error signal N has been inverted in polarity, a shorter code word is allocated. Meanwhile, if the prediction error signal N has not been inverted in polarity, a longer code word is allocated.

A coding rate of the lossless compression of images can be improved by adaptively inverting the prediction error signal M as described above. As for the mechanism of polarity inversion in this case, more efficient compression is executable by a prediction error signal M of a negative value.

For the purpose of enhancing the coding efficiency, the entropy encoder 5 can generate a shorter code word by utilizing the bias of the polarity of the prediction error signal M.

Figure 6:
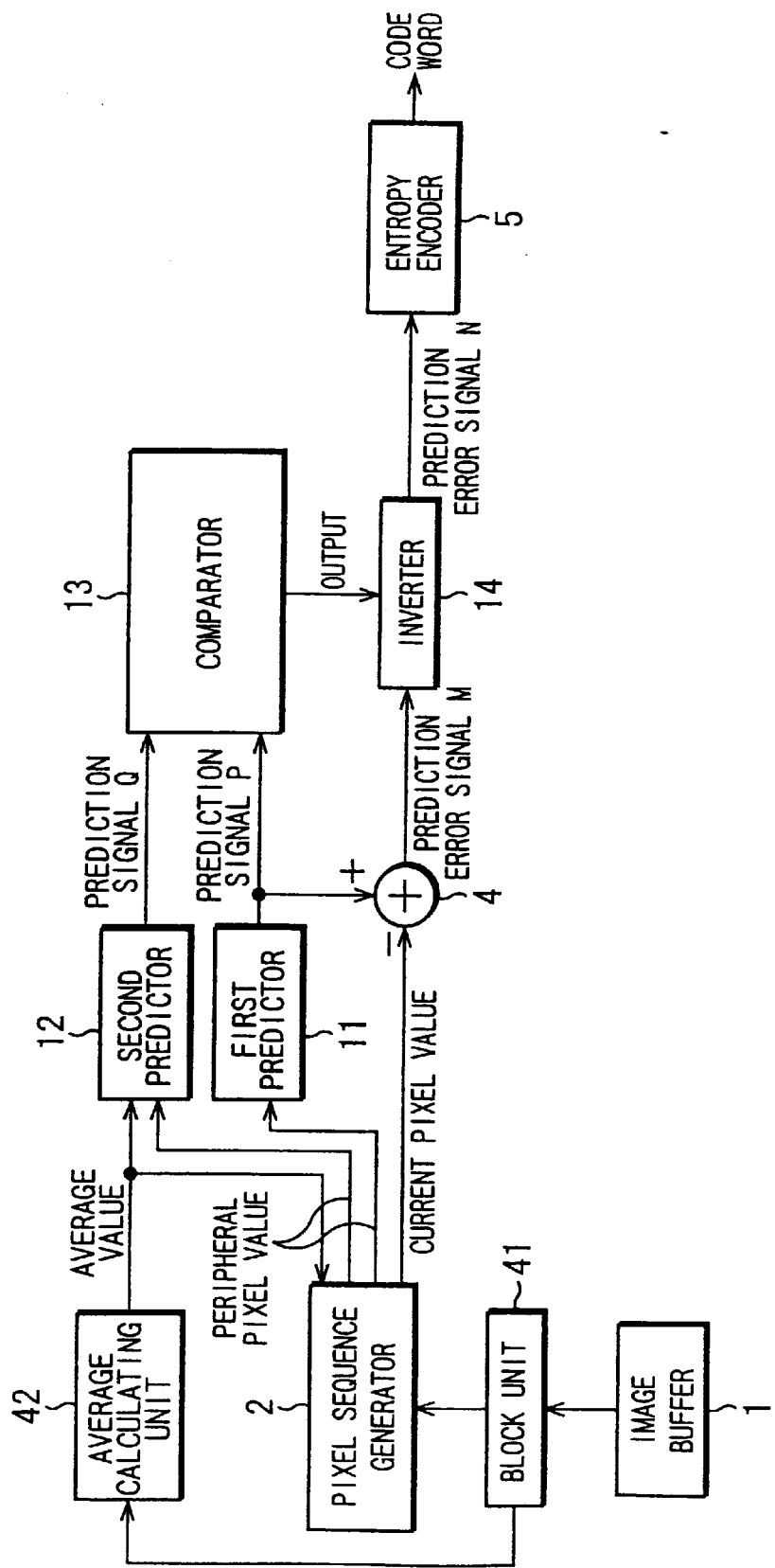
FIG. 6 is a block diagram showing a structural example of another lossless image compressing apparatus where the present invention is applied.

FIG. 6 is a block diagram showing a structural example of another lossless image compressing apparatus where the present invention is applied. In this diagram, any component parts corresponding to those in FIG. 2 are denoted by the same reference numerals, and a repeated explanation thereof is omitted here. In this structural example, a block unit 41 is provided between an image buffer 1 and a pixel sequence generator 2, and an average calculating unit 42 is provided as an output destination of the block unit 41. Any other structure is the same as that in FIG. 2.

The block unit 41 divides the image, which is stored in the image buffer 1, into blocks each composed of 6×6 pixels for example, and supplies each block 61 (FIG. 7) to the pixel sequence generator 2 while supplying the block 61 also to the average calculating unit 42.

The pixel sequence generator 2 scans the block 61 (FIG. 7) supplied from the block unit 41, then extracts, with regard to each pixel, peripheral pixels (22 to 24 in FIG. 7(A)) from a subject pixel (21 in FIG. 7(A)) currently and supplies the current pixel value to an adder 4 while supplying the generated peripheral pixel values to a first predictor 11 and a second predictor 12 respectively.

The average calculating unit 42 calculates the average value of the block 61 (FIG. 7) supplied thereto from the block unit 41, and supplies the calculated average value to the first predictor 11, the second predictor 12 and the pixel sequence generator 2 respectively.

The first predictor 11 calculates a prediction signal P on the basis of the peripheral pixel values of the peripheral pixels 25 (FIG. 3(B)) supplied from the pixel sequence generator 2, and then supplies the signal P to a comparator 13 and the adder 4 respectively.

The second predictor 12 calculates a prediction error signal N on the basis of the peripheral pixel values of the peripheral pixels 25 (FIG. 3(B)) supplied from the pixel sequence generator 2, and also on the basis of the average value supplied from the average calculating unit 42.

Next, an explanation will be given on the operation performed in the above embodiment.

The average calculating unit 42 calculates the average value of the block 61 (FIG. 7) supplied thereto from the block unit 41. Here, the average value is defined as the value divided by the number of pixels in the block into the total value of the entire pixels in the block 61. As for the average calculation method executed by the average calculating unit 42, the prediction signal P is furnished as an upper left sample of the block 61, or the prediction signal Q is furnished selectively.

The pixel sequence generator 2 scans the image stored in the image buffer, then extracts peripheral pixels 25 from the subject pixel 21 (FIG. 3(A)) currently, and supplies the current pixel value X to the adder 4. The pixel values of the peripheral pixels 25 generated by the pixel sequence generator 2 are supplied to the first predictor 11 and the second predictor 12 respectively.

In case the peripheral pixels 22 to 24 adjacent to the subject pixel 21 are within the boundary of the block 61 as shown in FIG. 7(A), it is possible to measure the individual pixel values, so that the pixel sequence generator 2 is enabled to output the pixel values of the peripheral pixels 22 to 24 individually.

However, if the subject pixel 21 is on a row 62 as shown in FIG. 7(B), the peripheral pixels 23 and 24 are outside the boundary of the block 41, so that it is impossible to measure the pixel values. In such a case, therefore, the pixel sequence generator 2 allocates the average value, which is supplied from the average calculating unit 42, to the pixel values of the peripheral pixels 23 and 24.

In another case where the subject pixel 21 is on a column 63 as shown in FIG. 7(C), the peripheral pixels 22 and 24 are outside the boundary of the block 61, so that it is impossible to measure the pixel values as in the case of FIG. 7(B). In this case, therefore, the pixel sequence generator 2 allocates the average value, which is supplied from the average calculating unit 42, to the pixel values of the peripheral pixels 22 and 24.

The first predictor 11 generates a prediction signal P on the basis of the peripheral pixels 22 to 24 supplied from the pixel sequence generator 2. That is, as described above, the first generator 11 measures the values A, B and A+B−C from the peripheral pixels (A) 22, peripheral pixels (B) 23, and peripheral pixels (C) 24, and determines the intermediate value of A, B and C of the three peripheral pixels, as a prediction signal P.

The second predictor 12 generates a prediction signal Q on the basis of the peripheral pixels 22 to 24 supplied from the pixel sequence generator 2, and also on the basis of the average value supplied from the average calculating unit 42. First, the second predictor 12, as described above, calculates a value of Eq. (1) from the peripheral pixels (A) 22, peripheral pixels (B) 23, and peripheral pixels (C) 24.

That is, when the value obtained according to Eq. (1) is different from the prediction signal P, the result of calculating Eq. (1) is given as the prediction signal Q. Meanwhile, when the value obtained according to Eq. (1) is equal to the prediction signal P, the average value supplied from the average calculating unit 42 is given as the prediction signal Q.

Since the operation performed thereafter is the same as that described in connection with FIG. 2, a repeated explanation thereof is omitted here.

The processing routine mentioned above is executable by software as well as by hardware. When the processing routine is to be executed by software, the routine can be installed from a recording medium into, e.g., a computer where programs constituting the relevant software are incorporated in its exclusive hardware, or into a general-purpose personal computer which is capable of executing various functions in accordance with various program is installed therein.

This recording medium connotes a package one distributed for providing programs to users separately from the computer, and it includes a magnetic disk (including flexible disk), an optical disk (including CD-ROM (Compact Disk-Read Only Memory) and a DVD (Digital Versatile Disk)), a magneto-optical disk (including MD (Mini Disk)(registered trademark)), or a semiconductor memory where programs are recorded. The recording medium may further include a ROM, a hard disk and so forth where programs are recorded and provided for users in a state incorporated previously in a computer.

In this specification, the steps that describe the program stored in the recording medium are executed in time series in accordance with the mentioned sequence, or may be executed in parallel or individually without being restricted to the time series processing.

INDUSTRIAL APPLICABILITY

According to the present invention, as described hereinabove, the pixel value of three peripheral pixels adjacent to the subject pixel currently is measured to generate a first prediction signal from the measuring result, and the average value of the maximum and the minimum out of the measured values of the three peripheral pixels is generated as a second prediction signal. Then a prediction error signal is calculated on the basis of the first prediction signal and the pixel value of the subject pixel, and the polarity of the prediction error signal thus calculated is inverted on the basis of the result of comparing the first prediction signal with the second prediction signal. And subsequently a code word is allocated in accordance with the calculated prediction error signal, thereby realizing improved lossless compression of images more efficiently.

What is claimed is:

1. An image processing apparatus for lossless compression of images, comprising:

first generator for measuring the pixel values of three peripheral pixels adjacent to a subject pixel, and generating a first prediction signal from the measuring result;

second generator for generating a second prediction signal which represents the average value of the maximum and the minimum out of the measured values of the three peripheral pixels;

calculator for calculating a prediction error signal on the basis of the first prediction signal generated by said first generator and the pixel value of said subject pixel;

comparator for comparing the first prediction signal generated by said first generator with the second prediction signal generated by said second generator;

inverter for inverting, on the basis of the comparison result obtained from said comparator, the polarity of the prediction error signal calculated by said calculator; and invertercode word allocator for allocating a code word in accordance with the prediction error signal inverted in polarity by said inverter.

2. The image processing apparatus according to claim 1, wherein said first generator measures the values A, B and A+B−C from the respective values A, B and C of said three peripheral pixels, and generates the intermediate value thereof as said first prediction signal.

3. The image processing apparatus according to claim 1, wherein, when the first prediction signal generated by said first generator is greater than the second prediction signal generated by said second generator, said inverter does not invert the polarity of the prediction error signal.

4. The image processing apparatus according to claim 1, wherein, when the first prediction signal generated by said first generator is smaller than the second prediction signal generated by said second generator, said inverter inverts the polarity of the prediction error signal.

5. The image processing apparatus according to claim 1, wherein said peripheral pixels consist of the pixel on the left side of the subject pixel, the pixel on the upper side of the subject pixel, and the pixel on the upper left side of the subject pixel.

6. The image processing apparatus according to claim 1, wherein said first generator is a median adaptive predictor.

7. An image processing method carried out in an image processing apparatus for lossless compression of images, comprising the steps of:

measuring the pixel values of three peripheral pixels adjacent to a subject pixel, and generating a first prediction signal from the measured results;

generating a second prediction signal which represents the average value of the maximum and the minimum out of the measured values of the three peripheral pixels;

calculating a prediction error signal on the basis of the generated first prediction signal and the pixel value of said subject pixel;

comparing the generated first prediction signal with the generated second prediction signal;

controlling, on the basis of the result of the comparison, inversion of the polarity of the calculated prediction error signal; and allocating a code word in accordance with the controlled polarity inversion of the prediction error signal.

8. The image processing method according to claim 7, wherein the values A, B and A+B−C are measured from the respective values A, B and C of said three peripheral pixels, and the intermediate value thereof is generated as said first prediction signal.

9. The image processing method according to claim 7, wherein, when the generated first prediction signal is greater than the generated second prediction signal, the polarity of said prediction error signal is not inverted.

10. The image processing method according to claim 7, wherein, when the generated first prediction signal is smaller than the generated second prediction signal, the polarity of said prediction error signal is inverted.

11. The image processing method according to claim 7, wherein said peripheral pixels are composed of the pixel on the left side of said subject pixel, the pixel on the upper side of said subject pixel, and the pixel on the upper left side of said subject pixel.

* * * * *